United States Patent [19]

White et al.

[11] 4,290,538

[45] Sep. 22, 1981

[54] FUEL-DISPENSING SYSTEM WITH SELF-CHECKING MEANS

[75] Inventors: Roy L. White, Cambridge; David F. A. Leevers, St. Albans; Peter W. Kitchin, Foxton, all of England

[73] Assignee: Dresser Europe S.A., Brussels, Belgium

[21] Appl. No.: 4,316

[22] Filed: Jan. 18, 1979

Related U.S. Application Data

[63] Continuation of Ser. No. 732,476, Oct. 14, 1976, abandoned.

[30] Foreign Application Priority Data

Oct. 15, 1975 [GB] United Kingdom ............... 42271/75

[51] Int. Cl.[3] ......................... B67D 5/08; G06F 15/20

[52] U.S. Cl. ........................................ 222/25; 222/32; 222/36; 235/92 EC; 235/92 FL; 364/464

[58] Field of Search ............................. 222/23, 25-28, 222/32, 33, 36, 37, 40, 71, 76; 364/464, 465, 119, 737, 738; 235/61 M, 92 FL, 92 EC, 94 R, 94 A, 306; 307/64, 66; 340/146.1 AG, 606, 609, 610; 365/228, 229; 371/68

[56] References Cited

U.S. PATENT DOCUMENTS

| | | | |
|---|---|---|---|
| 3,243,583 | 3/1966 | Giot et al. | 364/465 X |
| 3,749,283 | 7/1973 | Nelson | 222/27 |
| 3,782,597 | 1/1974 | Hansen et al. | 222/28 |
| 3,783,248 | 1/1974 | Sugden, Jr. | 235/92 FL |
| 3,859,638 | 1/1975 | Hume, Jr. | 365/229 |
| 3,894,658 | 7/1975 | Buell, Jr. | 364/465 X |
| 3,943,500 | 3/1976 | Buchanan | 340/253 R |
| 3,949,207 | 4/1976 | Savary et al. | 364/465 X |
| 4,107,777 | 8/1978 | Pearson et al. | 222/26 X |

FOREIGN PATENT DOCUMENTS

| | | | |
|---|---|---|---|
| 882751 | 11/1961 | United Kingdom | 364/738 |
| 1402156 | 8/1975 | United Kingdom | 235/92 FL |

OTHER PUBLICATIONS

*IBM Technical Disclosure Bulletin*, "Power Out Warning Interrupt Circuit", De Mong, May 1976, vol. 18, No. 12, pp. 4147-4149.

*Electronic Circuits Manual*, Markus, ed., McGraw-Hill 1971, pp. 5 and 23.

*Primary Examiner*—Robert J. Spar
*Assistant Examiner*—Edward M. Wacyra
*Attorney, Agent, or Firm*—Laff, Whitesel & Rockman

[57] ABSTRACT

A processor is used to control a price display unit for a fluid-dispensing system. The amount of fluid dispensed by the system in measured and information responsive thereto is fed to the processor. The processor calculates the cost of the dispensed fluid and those costs are then displayed. The processor automatically cross-checks the validity of the displayed cost with the amount of fluid dispensed. A plurality of self-checking features insure proper system operation and also preserve signals stored in a memory if there is a power failure.

18 Claims, 7 Drawing Figures

FUEL-DISPENSING SYSTEM WITH SELF-CHECKING MEANS

This is a continuation of application Ser. No. 732,476, filed Oct. 14, 1976, now abandoned.

This invention relates to a system for use in dispensing fluids and it has particular, though not exclusive, application to pumps for delivering fuel for motor vehicles.

Such fuel pumps commonly include mechanical apparatus for calculating the amount of fuel dispensed and its cost and controlling the facilities available.

The apparatus of the present invention employs electronic control apparatus to perform these functions. Apart from the obvious advantage that there is a minimum of moving parts, the use of an electronic control apparatus enables changes to be made in the pricing of the fuel and in the units in which the fuel is to be measured to be made comparatively easily. Furthermore, information can easily be fed to a central control station to enable the operation of the system to be monitored.

In the preferred embodiment to be described the display at the pump is by means of electromagnetic flap type units in which the numeral being displayed is made up of seven discrete movable elements. However, other display means, for example light emitting diode displays, incandescent filament displays or liquid crystal displays could be employed in appropriate situations.

Running totals of the cost of sales and of the volume of fluid dispensed are maintained by the unit's computer and can be displayed upon request by operating a totalise button.

In the event of line power failure, the totalised information is stored in a shift register, powered by a standby battery.

Calculation and control facilities are provided by a 4 bit microcomputer, with a program stored in programmable read-only memory. In the preferred embodiment of the invention, it is convenient to employ, as a central process controller devices which have become readily available as a result of modern technology and are at present generally known as mini- or micro-computers, mini- or micro-processors or central processing units.

However, it will be understood that arrangements in accordance with the invention can use other forms of process controller, for, example, mechanically operated process controllers and devices which are controlled by wired logic setup, in a well-known way, on a circuit board so that a "program" is stored by the physical wiring connections between input and output terminals on the board, or by means of instructions stored in any other readily available memory, in a well-known way.

A four digit unit price is set on thumbwheel switches. Volume information is derived from an optical-interrupter disc pulser, and displayed together with the computed cash value on duplicated displays. Five digits of volume and cash are displayed.

Solid state line voltage switches allow the computer to control pump motor or solenoid valves. Volume and cash pulse outputs are provided to drive external counting equipment. The units per pulse are defined in the computer program.

Two or more additional sets of unit price switches, together with a grade select switch, may be added to give three or more grade operation.

Line authorization signal operation and the optional display of thousandths of gallons are provided.

Connections to the pulser and to controls external to the unit are made via intrinsically safe barriers.

The computer program allows operation in gallons or liters, together with an adjustable cash decimal point position and optional half penny for different currencies. A software facility to limit the maximum volume per delivery is included. A 4-bit code, set up with wire links, is ready by the computer to define the required configuration.

The program provides continuous checking of pulser and unit price switch operation, together with a shutdown sequence in the event of line power failure. Display segment coil testing and processor self-checking are provided where required by the country of installation.

An embodiment of the invention will now be described, by way of example, with reference to the accompanying drawings in which.

Figure 1:
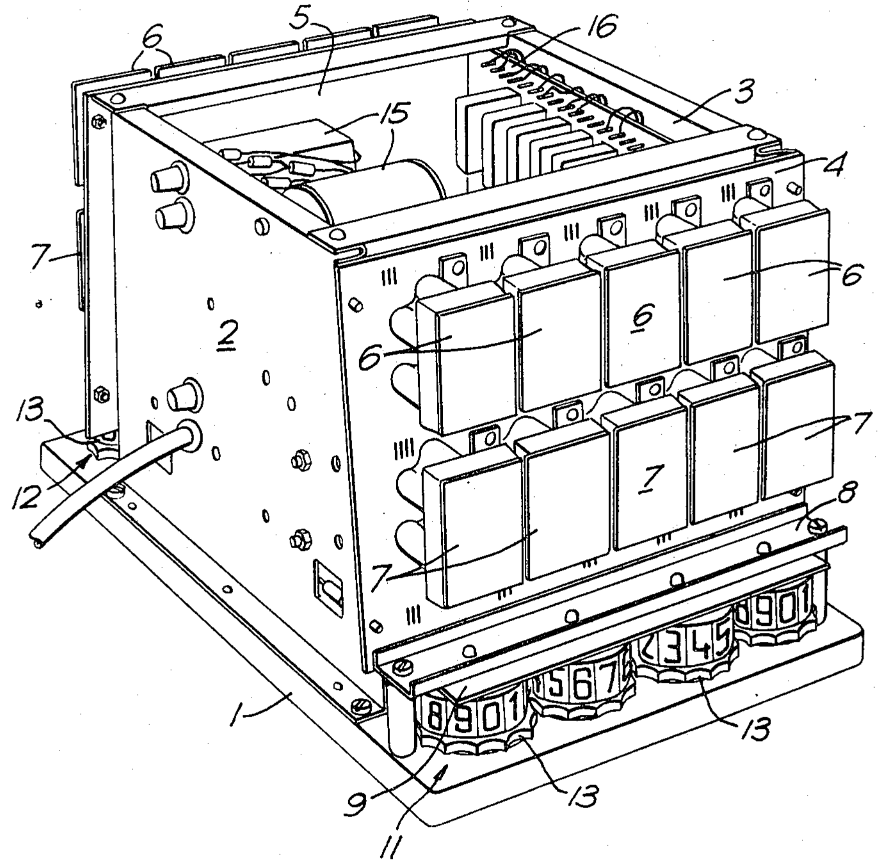
FIG. 1 is a perspective view of the basic elements of a machine.

Referring to FIG. 1, there is shown an assembly which comprises a display and control circuit arrangement for a fuel dispenser. The assembly includes a base plate 1 upon which there are two side plates 2 and 3 which support two similar printed circuit boards 4 and 5. Upon each of the boards 4 and 5, there are a first and a second row of electromechanically operated digital display devices 6 and 7. The devices 6 are used to display the quantity of fuel dispensed and the devices 7 display the price of the fuel dispensed.

Supported on brackets, such as that shown at 8, mounted on the boards 4 and 5, there is a printed circuit processor board 9. Beneath each of the boards 4 and 5 and, between the processor board 9 and the base 1, there is a respective row 11 and 12 of thumbwheel operated unit price switches 13.

Each switch 13 in the row 11 is linked mechanically to the corresponding switch in the row 12 so that, when one of them is rotated, the corresponding switch on the opposite side of the machine is rotated to display the same value.

The switches 13 in the row 11 have contacts which co-operate with suitable printed circuit patterns on the processor board 9 to enable circuit connections to be set up, as required, to program the apparatus to calculate the cost of the fuel dispensed according to the unit price set on the thumbwheel switches in the rows 11 and 12 and the amount of fuel dispensed. It will be appreciated that, in the embodiment described, the thumbwheel switches will be used by the vendor to set the price of the fuel and that only one grade of fuel will be dispensed from the particular fluid-dispensing system. The apparatus could, of course, be modified to enable prices to be set on a plurality of price selectors, one for each of a plurality of grades of fuel, and for a grade selector switch to be used to select a particular grade and price.

The assembly shown has the components of its power supply mounted on the side plate 2, as indicated at 15, and a printed circuit board 16, which carries safety barrier and interface circuits, adjacent the side plate 3.

Figure 2:
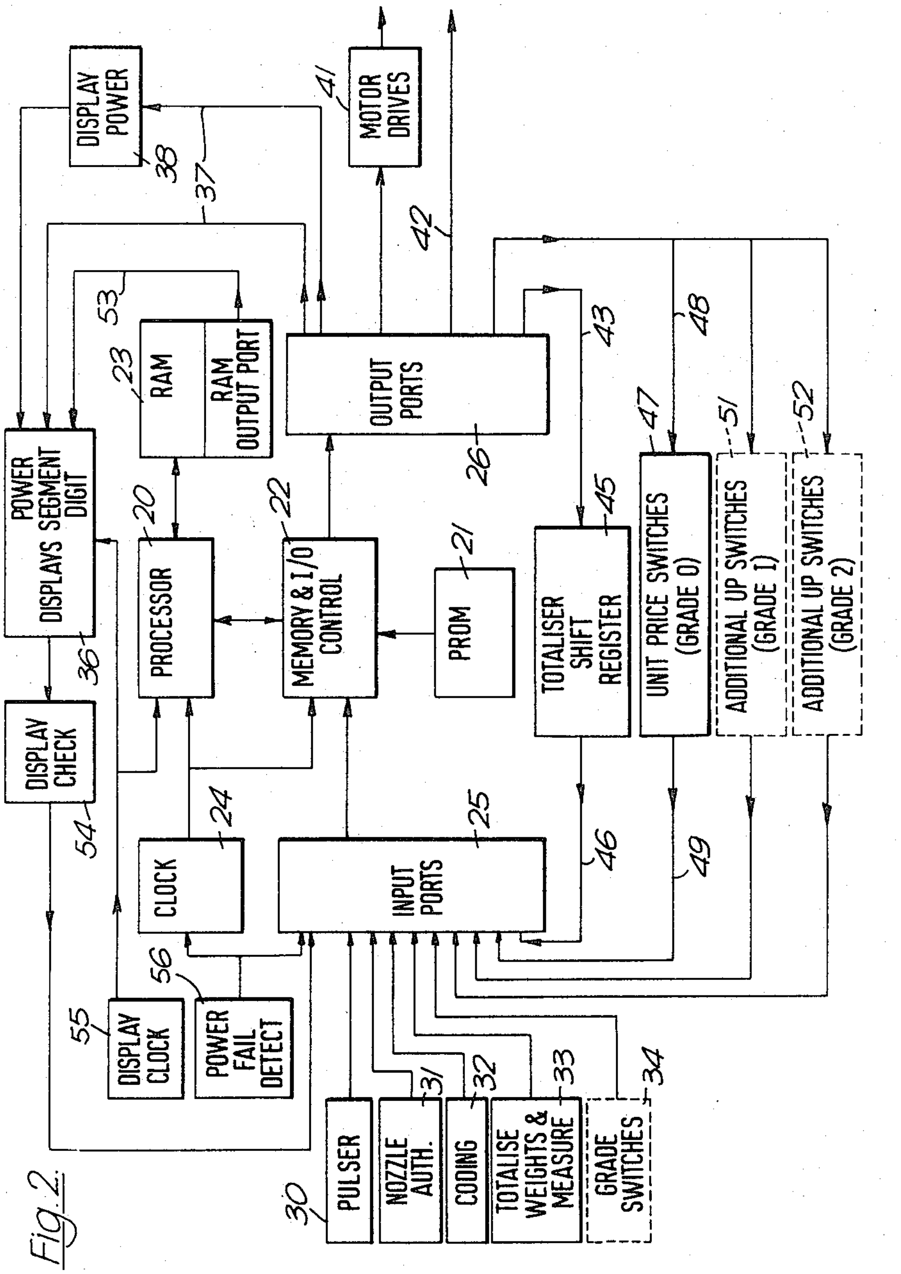
FIG. 2 is a block schematic diagram of the electric circuit of the machine.

Referring to FIG. 2, there is shown a fluid-dispensing apparatus FDA and block schematic diagram of the basic electric circuit arrangement. The circuit includes a 4 bit micro-computer, having a processor 20, a read-only memory 21 coupled to the processor 20 via a memory and input-output control interface unit 22, a random access memory 23, a clock 24, and input and output ports 25 and 26.

The computer could, of course, be of some other type, for example it could be composed of 8 or 16 bit units. The processor 20 performs arithmetic and logic operations upon data presented to it. The type of operation performed by the processor 20 is determined by the instructions given to it in accordance with the program held in the read-only memory 21. The instructions are transferred to the processor via the memory and input-output control interface unit 22. The random access memory 23 provides a store for information required during the working of the processor and is used, for example, to hold temporary data including the unit price of the fuel and running totals of quantities sold.

The clock 24 provides two phase clock signals to operate the micro-computer.

Inputs to the computer unit from external sources are applied via respective ones of the input ports 25 and intrinsic safety barriers (not shown). The safety barriers include zener diodes that break down at predetermined voltage levels and prevent any stray voltage from within the circuits, above the particular predetermined level, from reaching regions where it might present a hazard.

The amount of fuel dispensed is determined by counting the number of output pulses which are applied from a pulser unit 30 to the apparatus via a respective one of the input ports 25. In the pulser unit 30, a member rotates in accordance with the amount of fuel being dispensed and causes the path of a beam of light to be interrupted and a sensor of the light beam to give electrical output pulses in accordance with the interruptions caused by the rotation of the member. Such arrangements are well known. In fact, the pulser 30 provides an output having two separate square wave signals arranged in quadrature. By monitoring these two separate signals, it is possible to determine whether or not the pulser is rotating in the correct direction and smoothly and to take the appropriate action if it is not.

A further signal applied to the apparatus from an external source via a respective input port 25 is from a switch 31 on the dispensing nozzle to indicate to the computer that the system is in use.

A coding unit 32 can be set by adjusting wire links therein to provide a bit code which is read by the computer via a respective one of the input ports 25 to determine which of a plurality of operations is used. Thus a code from the unit 32 can determine, for example, whether the fuel is to be measured in liters or gallons, the position of the adjustable decimal point in the cash display and the maximum volume of fuel allowed to pass per delivery.

A further coded signal from a totalize unit 33, when read via a respective input port 25 by the computer, causes the total volume of the fuel dispensed to be displayed to the nearest thousandth of the unit volume in which the measurement is made, rather than to the nearest hundredth, thereby enabling a simple check to be made on accuracy.

Finally, there is shown an input to the computer from a grade switch 34, shown in a dotted outline, and for use in a system in which more than one grade of fuel is to be dispensed. The signals applied via the input ports 25 are fed via the input control circuits in the unit 22 to control the processor 20 in such a way that a desired result is obtained.

Respective output ports 26 couple output signals received from the processor 20 via output control circuits in the unit 22 to volume and cash displays at 36 via line 37. Power for the displays 36 is provided from a unit 38, under the control of a signal on a line 39 from an output port 26. Control signals for motor drives 41 are also provided from a respective one of the output ports 26. Duplicate cash and volume display signals can be provided on line 42 for use in enabling remote duplicate displays to be provided if required. Signals from a respective output port 26 are also provided on a line 43 to a totalizer shift register 45 which stores the running totals of the information generated by the computer, for example total volume dispensed and amounts of cash, in such a way that when normal line power is cut off from the unit none of the information is lost. Upon the restoration of power, the information can then be read back into the computer via a line 46 and a respective one of the input ports 25.

Unit price switches 47, corresponding to those shown at 11 and 12 in FIG. 1, are interrogated by signals from one of the output ports 26 on a line 48 and the result of the interrogation is fed to the computer via line 49 and one of the input ports 25.

Should it be desired to dispense more than one grade of fuel, further sets of unit price switches can be provided, as indicated for example at 51 and 52 by dotted outlines, for each of the additional grades.

In order to display totals, as required, on the displays 36, a further input is applied to the displays 36 from an output of the random access memory 23 on a line 53. A display check circuit arrangement 54 is connected between the displays 36 and one of the input ports 25 for use in checking the validity of the displays. The displays are under the control of a clock 55 having an output coupled to the processor 20 and the displays 36. A circuit 56, for use in detecting power failure and initiating the actions necessary to safeguard the system, is coupled to the clock 24 and to one of the input ports 25.

It will be understood that, in operation, input signals applied to the micro-computer via the input ports 25 condition the operation of the appropriate constituent parts of the micro-computer and result in outputs being applied to the displays 36 according to the amount of fuel dispensed and the cost of the fuel per unit volume. The particular arrangement shown in FIGS. 1 and 2 is completely self-contained and can be used as a replacement for the individual mechanical indicating and computing system normally employed in each pump. On the other hand, the arrangement shown can be controlled from a central location and information displayed and information concerning the functioning of the apparatus can be fed from each self-contained arrangement to the central location for monitoring purposes.

A feature of the arrangement being described is the number of checks that are provided to determine whether or not the apparatus is performing correctly.

The apparatus employs logic circuits operated by means of digital signals and in the following description a logic (1) is defined as high, e.g. +15 volts and a logic (0) as low, e.g. 0 volts. Logic signals that are active and high will be denoted by (1) after the name of the unit or function, e.g. Digit 1 (1) and signals that are active and low will be denoted by (0) e.g. Segment A(0) after the name of the unit or function.

As an example of one check on the operation of the apparatus, it has already been mentioned that the pulser 30 generates two sets of pulses in quadrature, thereby enabling the computer to determine whether or not the rotating pulse generating member is rotating normally. As a further check, the computer is also able to detect the failure of the signal on one of two output lines carrying the respective quadrature signals from the pulser 30. By detecting, for example, that one output line from the pulser stays either high or low with, for example, three pulses on the other line, the computer is programmed to shut the dispenser down, judging that the pulser or its connections have failed. In the embodiment being described electromechanical flap type seven segment devices 6 and 7 are used to provide the displays 36. Although normally very reliable, the consequence of one flap of the devices 6 and 7 failing to operate when driven is that a wrong but still readable character may be shown. For instance, if an "eight" were being set and the center bar failed to operate, the apparent number displayed would be zero. In normal operation, a device 6 or 7 to be updated is first reset, by applying signals to reset coils, so that all segments are blanked, and then the required segment pattern is sent to "set" coils to produce a display of the desired character. An optional facility is therefore provided to permit checking of the integrity of both the set and reset coils for each segment of all twenty of the dislay devices 6 and 7. The means of checking the continuity of the coils will now be described with reference to FIG. 3.

Figure 3:
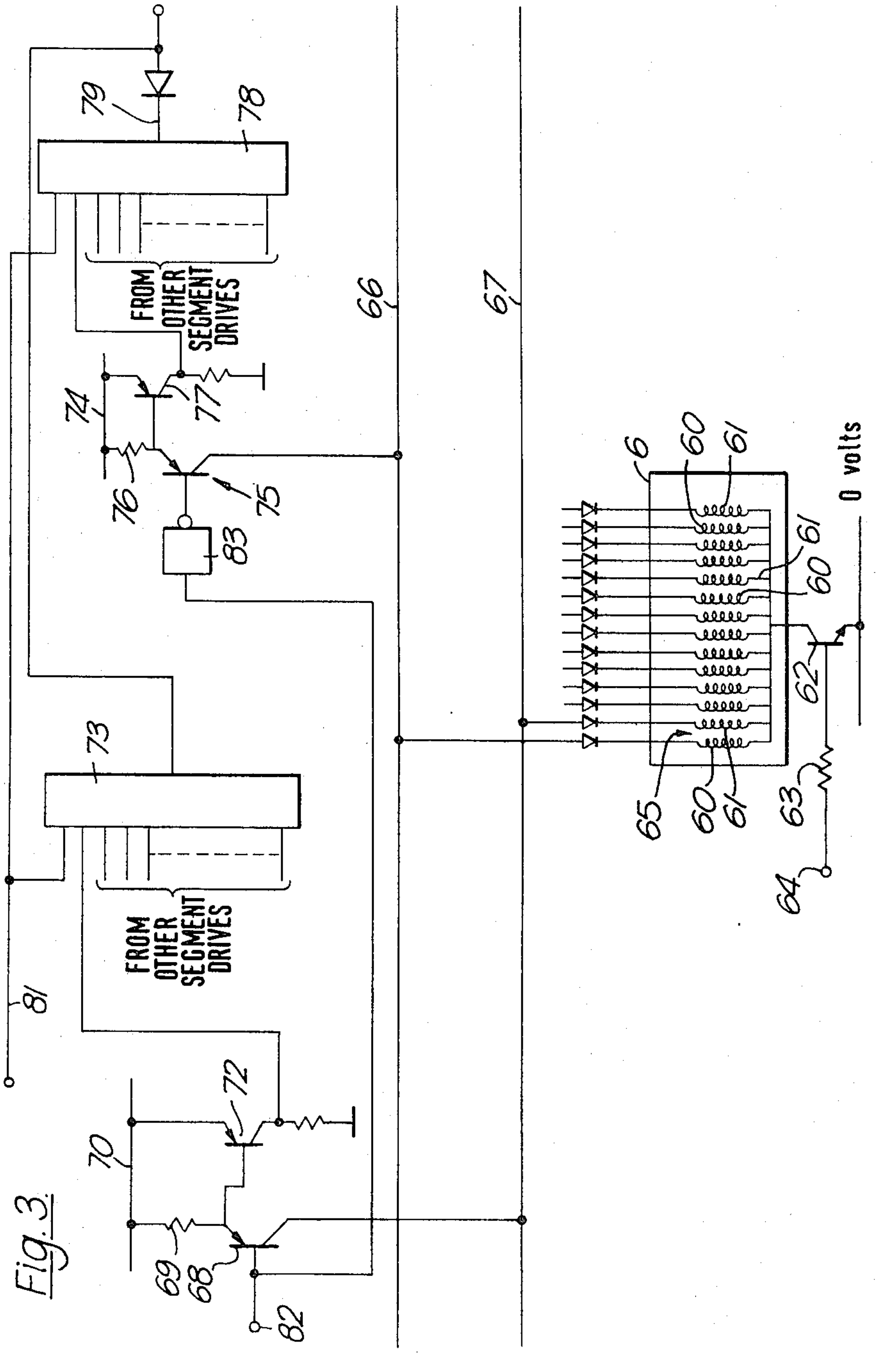
FIG. 3 is a detail of a part of the electric circuit diagram of the machine.

Referring to FIG. 3 there are shown diagrammatically the "set" and "reset" coils 60 and 61 respectively of each of the seven bars of a display device 6. One side of each of the coils 60, 61 is connected in common to the collector of a transistor 62 whose emitter is connected to a 0 voltage rail. The base of the transistor 62 is connected via a resistor 63 to a terminal 64 to which a digit 1 (1) signal is applied.

It will be understood that there are separate circuits for operating the set and reset coils of each of the segments and that these circuits are similar. The circuits required for operating the set and reset coils of one segment only are shown in FIG. 3 and it will be understood that the other segments are operated in a similar way.

Thus the "set" and "reset" coils 60 and 61 of the first bar 65 of the seven segment bars of the display device 6 are respectively connected to rails 66 and 67. Rail 67 is connected via a transistor 68 and a resistor 69 to a current source rail 70. The voltage drop across the resistor 69 is used to develop a signal which is applied via a transistor 72 to a parity checking integrated circuit 73 whose output is fed to the computer to detect any display error. The display check circuit arrangement is indicated at 54 in FIG. 2.

A similar operating and monitoring circiuit for the set coil 60 is also shown with the rail 66 connected to a current source 74 via a transistor 75 and a resistor 76. The voltage drop across the resistor 76 is used to develop a signal which is applied via a transistor 77 to a further parity checking integrated circuit 78 whose output is also fed to the computer to detect any display error via a line 79.

Parity check signals are fed to the circuits 73 and 78 via a line 81.

In operation, the device 6 is updated by applying a digit 1 (1) signal to terminal 64 setting the base of the transistor 62 high and turning the transistor 62 on.

To reset the segment bar 65, the transistor 68 is then turned on by applying a reset signal (0) to the base of the transistor 68 via a terminal 82, thereby causing current to flow through the reset coil 61 and the bar 65 to be reset. If the circuit is operating correctly and current flows through the coil 61, the signal resulting from the voltage drop across the resistor 69 will switch on the transistor 72 to cause the input to the parity checking circuit 73 to go high. If for any reason the input to the parity checking circuit 73 does not go high a signal will be applied from the output of the circuit 73 to the computer to indicate a fault condition.

To set the segment bar 65, the base of the transistor 68 is driven high, by applying an appropriate signal to the terminal 82, thereby turning transistor 68 off. The signal on terminal 82 is applied via inverter 83 to the base of transistor 75, thereby turning transistor 75 on. With transistor 75 on and a digit 1 (1) signal applied to the base of transistor 62, current is able to flow through set coil 60 and the bar 65 to be set. The flow of current through the coil 60 is checked by detecting the passage of current through resistor 76 by means of transistor 77 and applying an input to the parity checking circuit 78, in a similar way to that described with reference to circuit 73, in order to detect a fault condition and provide a signal to the computer which causes the system to be shut down.

At the completion of the updating operation, the transistor 62 is turned off. It will be understood that each display device 6 and 7 is provided with a selection transistor 62 and that the respective segment drive and checking transistors 68, 72, 75 and 77 are common to the first segment 65 of each of the devices 6 and 7. As has been mentioned, a similar common drive and checking circuit arrangement is provided for each similar segment of all of the display devices. If it is not required to check the operation of the segments all of the reset coils of each digit can be driven in parallel from a single transistor and there is no need for the current checking transistors 72 and 77.

Figure 4:
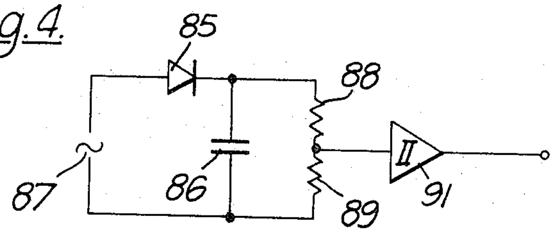
FIG. 4 is a further detail of a part of the electric circuit diagram.

The power failure detector circuit 56 shown in FIG. 2 is illustrated in FIG. 4 and includes a half wave rectifier 85 in series with a capacitor 86 connected across the mains supply at 87. A resistor 88 and a resistor 89 are connected across the capacitor 86 and the junction between the resistors 88 and 89 is connected to a Schmitt trigger circuit 91, which produces a signal to cause an orderly shut-down of the computer to take place within a few cycles of the interruption of the power supply. The shut-down is, in fact, completed before the charge stored on the main power supply rectifier of the system has decayed sufficiently to cause an erroneous operation to occur.

The first step of shutting-down the system is to transfer the sixteen digits of the stored volume and cash totals from the random access memory 23 to the totalizer shift register 45 (FIG. 2). Having completed this operation, the system then updates finally the displays 36 about one second from the time that power was cut-off, thereby taking into account the momentum of the pump and the motor.

The shift register 45 is powered by a rechargeable battery and when power is restored, the information in the shift register 45 is reloaded into the computer memory.

As mentioned previously, running totals of cash and volume are kept at all times in the random access memory 23. In order to display these totals for reading by a dispenser operator, a push-button switch (not shown) is provided whose operation causes the totals to be shown on the normal cash and volume displays 36, as indicated by line 53. When the switch (not shown) is first operated, its operation is detected by the processor 20 via the input port 25 (FIG. 2) and the computer enters a routine which causes outputs of all 8 digits of total volume to be fed to the displays 36 on either side of the unit provided by the devices 6 and 7. Only four of each of the cash and volume display devices 6 and 7 in a row are used, the left hand digits of the rows remaining blank. When the switch (not shown) is operated again, the total cash is displayed, and on the third operation the unit returns its normal function.

Figure 5:
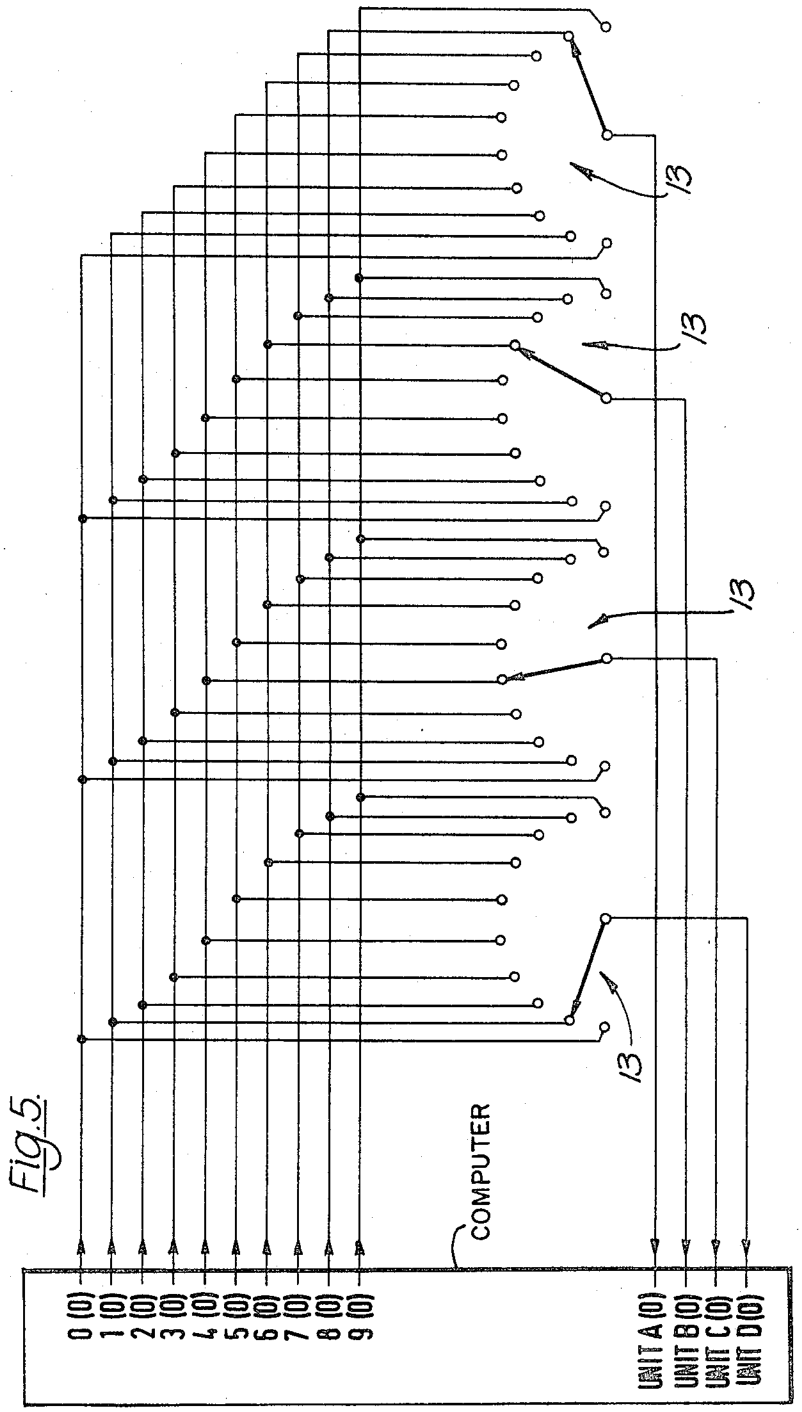
FIG. 5 is an electric circuit diagram showing connections to unit pricing switches, FIG. *6a* illustrates an output coupling circuit for a data processor and FIG. *6b* illustrates data pulses in phase encoded form.

A circuit diagram for one row of the unit price switches 13 is shown in FIG. 5. Each of the four switches is a single pole 10-way switch which is read at the start of a delivery by the computer. In order to read the switches, the computer generates a negative going strobe pulse at each of the ten bus-connected digit lines 0(0) to 9(0), at the same time reading the signals returned on the four lines UNIT A(0) to UNIT D(0). The computer can thus determine the setting of each switch. Only one return should occur for each switch and the computer checks that this is so, thereby protecting completely against switch failures due either to open circuits or shorted contacts.

A further built-in check of the operation of the apparatus is provided by multiplying the current volume figure for fuel dispensed stored in memory 23 by the unit price and checking it with the total price also stored in the memory 23 by employing a part of the computer. This is possible, without the need for additional equipment, since, at less than the normal flow rate, the computer is not working at its maximum capacity and can be employed to perform this check. If the answer is identical with the stored total price figure the delivery is allowed to continue but if there is any error the flow of fuel is cut off. Because the multiplication check routine uses different locations in the memory from those used in the normal price and volume calculation routine, the integrity of much of the system is also checked. It should also be noted that the unit price figure used in the check calculation is taken directly from the price switches 13 rather than from the memory 23. This checks the accuracy of the unit price data loaded into the memory 23 and also prevents the unit price being changed by any means during the course of a delivery.

It will have been noted that descriptions have been given of the detection of a number of different fault conditions by the computer. In every case, as soon as a fault is detected, the computer causes the pump motors to be switched off. In addition, in order to aid the service engineer to find the fault, when the pump is restarted after stopping on a fault condition, the computer is programmed to show a code number identifying the type of error on the display 36.

In some applications of a fuel dispenser, it is required that a remote control and display facility be provided, in order, for instance, that the dispensers can be used for self service, with post-delivery payment being made at a central cashier's stand or kiosk.

An option is provided in the computer software for all of the information present on the variable displays 36 (cash and volume), and that set on the unit price switches 13 to be sent out in serial form to an external device, upon the completion of a delivery. In the present example, data are transmitted at a rate of about 600 bits per second, so that 18 digits and a synchronising signal take a total time of about 120 ms to send.

Figure 6A:
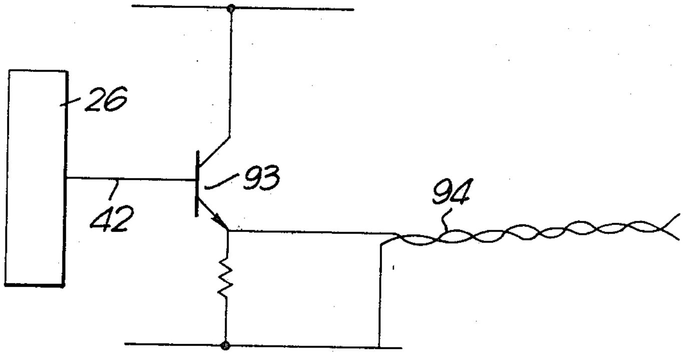
Figure 6B:
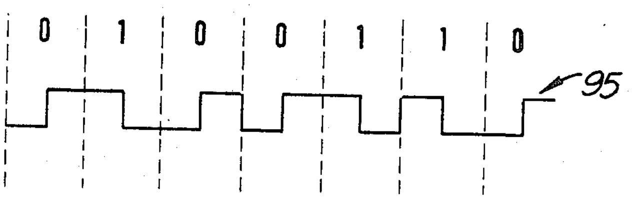

Those data for providing duplicate cash and volume signals are generated directly by the processor and are available on line 42 in FIG. 2. FIG. 6*a* shows a circuit for coupling these data from the line 42 via a simple emitter follower-connected transistor 93 to a twisted pair of leads 94, which are connected to a central cashier's stand or kiosk (not shown). In order to minimize the wiring, all of the data is transmitted serially in phase encoded form, as illustrated at 95 in FIG. 6*b*, thereby enabling the receiving apparatus at the central stand or kiosk to extract clocking information directly from the data stream, while avoiding the need for extra wires to carry a clock signal.

It will be appreciated that, although the invention has been described herein with reference to a particular embodiment, by way of example, variations, modifications and combinations of the arrangement described can be made within the scope of the appended claims.

It will also be appreciated that an important feature of the apparatus described is that it enables each dispenser to be completely self-contained, apart from the need for a power supply. It is not necessary for there to be any control from a central location, or for signals to be sent to a central station. However, the system has the advantage that it has the facility to be controlled easily from a central station and for information to be fed from it to a central station.

We claim:

1. A self-contained fluid-dispensing machine comprising means for measuring a dispensed fluid, said measuring means generating signals responsive to a flow of fluid through said fluid-dispensing machine for measuring an amount of fluid as it is actually being dispensed; said dispensing machine further including computer means having a processor interconnected with said measuring means for monitoring the operation of said machine, means responsive to said signals from said measuring means for feeding information to the computer means relative to said amount of fluid dispensed and measured by the measuring means; means in the computer means for calculating the cost of the measured amount of dispensed fluid in accordance with a predetermined unit price; means for visibly displaying the amount of said fluid dispensed and the corresponding cost thereof; and self-checking means responsive to said computer means including means for continuously, positively and actively self-checking the validity of the said displays.

2. A self-contained fluid-dispensing machine comprising computer means including a processor, means responsive to a flow of fluid for measuring an amount of fluid dispensed, means responsive to said measuring means for feeding information to the computer means relative to said amount of fluid dispensed and measured by the measuring means, a plurality of single pole multi-way switch means, each of which is settable to a particular one of the multi-way positions to represent a particular digit of a unit price, the computer means including means for scanning the multi-way connections to all of the switches simultaneously, means in the computer means for calculating the cost of the measured amount of fluid in accordance with the unit price set by the positions of said multi-way switched means, means for visibly displaying the amount of said fluid which is dispensed and the calculated corresponding cost thereof, and means in the computer means for checking that only one signal is read from the single pole of each of said multi-way switches during a respective scan.

3. A self-contained fluid-dispensing machine comprising computer means including a processor within said machine; means within said machine responsive to a flow of fluid through said machine for measuring an amount of fluid as it is being dispensed, means responsive to said fluid measuring means for feeding information to the computer means relative to said amount of fluid dispensed and measured by the measuring means; means in the computer means for calculating the cost of the measured amount of fluid in accordance with a predetermined unit price; means responsive to said fluid-measuring means for visibly displaying on said machine the amount of said fluid which is dispensed and the corresponding cost thereof; and self-checking means entirely within said machine for operating said computer means in order to continuously, positively and actively check the display means, said display checking means including means for monitoring a signal applied within said machine in order to operate an element in the display means on said machine, means for comparing an output from the monitoring means with a parity signal from the computer means in order to verify the operation of said machine, and means for applying an output signal from the comparison means to the computer.

4. A machine as claimed in claim 3 including mechanically operated elements in the display means, a set coil and a reset coil for operating each of the elements, the monitoring means being arranged to detect the application of a signal to the set and the reset coil of each element.

5. A gasoline dispenser having self-contained therein both a fluid-dispensing machine and an electronic monitoring system for observing and checking the operation of said machine, said monitoring system comprising computer means including a processor, means responsive to a fluid flow through said machine for generating signals for measuring an amount of gasoline dispensed, means in the computer means responsive to said generated signals for independently calculating the cost of the measured amount of gasoline in accordance with a predetermined unit price, means for visibly displaying on said machine the amount of said gasoline dispensed and the corresponding cost thereof, means in the computer means responsive to said independent calculations for checking the accuracy of the visible display on said machine, power failure detector circuit means, the power failure detector circuit means comprising a half wave rectifier and a capacitor connected in series across a power supply source, a resistor network connected in series across a power supply source, a resistor network connected across the capacitor, and a Schmitt trigger circuit connected to an output obtained from the resistor network.

6. A dispenser as claimed in claim 5 including a totaliser shift register and means under the control of the power failure detector circuit to transfer information from the computer to the shift register upon the failure of power.

7. A gasoline dispenser having self-contained therein both a fluid-dispensing machine and a system for observing and checking the operation of said machine, said observing and checking system comprising computer means including a process, said dispenser including means responsive to a flow of fluid for measuring an amount of fluid dispensed, means responsive to said measuring means for feeding information to the computer means relative to said amount of fluid dispensed and measured by the measuring means, means in the computer means for independently calculating the cost of the measured amount of fluid in accordance with a predetermined unit price, means for visibly displaying on said machine the amount of said fluid dispensed and the corresponding cost thereof, means in the computer means responsive to said independent calculation for checking the visible display on said machine, and means for coupling an output from the computer means to a remote station, the coupling means including an emitter-follower connected transistor.

8. A self-checking, gasoline dispenser comprising means responsive to a flow of gasoline dispensed through said dispenser for generating electrical signals within said dispenser representing at least the volume of the dispensed gasoline, means for generating parity signals which accompany said gasoline dispensing caused signals, calculating means responsive to said electrical signals generated responsive to gasoline flow through said dispenser for calculating the cost of the dispensed gasoline in accordance with a predetermined unit price of the dispensed gasoline, means responsive to said calculating means for visibly displaying in association with the dispenser the calculated cost of the dispensed gasoline, said display means having a plurality of individually activated display elements, self-checking means responsive to said calculating means for continuously, positively and actively checking the operation of said display means in order to self-check the validity of said visible cost display as a function of the volume of gasoline actually dispensed, said self-checking means including monitoring means for detecting the application of a signal to each of the display elements, and parity check circuit means responsive to said parity signals and signals from the monitoring means for indicating the validity of the results given by the displays.

9. The dispenser of claim 8 wherein each of said display elements is a mechanically operated segment and a set coil and a reset coil for selectively operating each of the segments.

10. The dispenser of claim 8 wherein said self-checking means comprises means for storing in a memory circuit means a current total value of the dispensed gasoline and a current total volume of the gasoline dispensed, means for multiplying the current total volume of gasoline dispensed by said predetermined unit price, and means for comparing the results of said multiplication with the current total value of gasoline dispensed as said total value is stored in the memory circuit means and for shutting down the dispenser in the event that said comparing means finds a discrepancy.

11. The dispenser of claim 8 wherein the electrical signal generating means in said self-checking dispenser includes a pulse generator means having a rotating member which is turned by said flow of gasoline, said pulse generator means generating two sets of pulses which are in quadrature as the gasoline is dispensed, means for monitoring the two sets of pulses to detect whether or not the member is rotating correctly, and means for shutting down the system if said pulse monitoring means detects an incorrect operation of the rotating member.

12. The dispenser of claim 11 and means for comparing the number of pulses in the two sets of pulses and for shutting down the dispenser in the event that a discrepancy is detected responsive to said comparison.

13. The dispenser of claim 8 wherein said self-checking means comprises memory circuit means, means for storing in said memory circuit means a current total value of the dispensed gasoline and a current total volume of the dispensed gasoline, a power failure detector means, a totalizer shift register means powered by an independent power source, and means under the control of the power failure detector means for transferring information from the memory circuit means to the shift register means responsive to a detection of a power failure.

14. The dispenser of claim 8 and means responsive to said self checking means for indicating by a display of a coded signal the identity of a fault condition.

15. A self-checking, fluid-dispensing system comprising signalling means responsive to a flow of fluid dispensed through said system for generating electrical signals representing at least the volume of the dispensed fluid, calculating means responsive to said electrical signals for calculating the cost of the dispensed fluid in accordance with a predetermined unit price of the dispensed fluid, means responsive to said calculating means for visibly displaying the calculated cost of the dispensed fluid, self-checking means for continuously, positively and actively self-checking the validity of said visible cost display, a plurality of single pole multi-way switch means, each of said switch means being settable to a particular one of the multi-way positions to represent particular digits of the unit price, said self-checking means comprising means for simultaneously scanning the multi-way connections of each of the switch means, and means for checking to be sure that only one signal is read from the single pole of each switch means during a single scan and for shutting down the system if a fault condition exists.

16. A gasoline-dispensing system especially for retail sales, said system comprising fluid flow metering means for mechanically measuring gasoline as it is dispensed by said dispensing system and for developing fluid flow metering signals responsive thereto, memory means responsive to said signals for storing the volume of gasoline that is dispensed by said system, means for storing preselected price data in said dispensing system, means for displaying to a customer the price and amount of gasoline that is dispensed, microprocessor means for separately calculating the price of gasoline by multiplying the volume of gasoline stored in said memory means by said preselected price data set into said dispenser, and means jointly responsive to the mechanically measured volume of dispensed gasoline and to the separately calculated price for shutting down said dispensing system when an error is indicated.

17. The system of claim 16 wherein said fluid flow-metering means develops at least two trains of pulses having a predetermined relationship with each other only when said fluid flow metering means is operating in a normal manner, and means for shutting down said dispensing system when said pulses are in any relationship other than said predetermined relationship.

18. The system of claim 16 wherein said means for storing said preselected price data in said dispensing system comprices a predetermined number of switches which are separately set, means in said dispensing system for checking the number of switches which are set, and means for shutting down said dispensing system if an incorrect number of said switches appear to have been set.

* * * * *

UNITED STATES PATENT AND TRADEMARK OFFICE

CERTIFICATE OF CORRECTION

PATENT NO. : 4,290,538

DATED : SEPTEMBER 22, 1981

INVENTOR(S) : White, et al.

It is certified that error appears in the above—identified patent and that said Letters Patent is hereby corrected as shown below:

Col. 5, Line 34, after "the", "dislay" should be --display--; after "the", insert --possible-- before "display";

Col. 5, Line 54, "rails" should be --busses--; "Rail" should be --Bus--;

Col. 5, Line 56, "rail" should be --bus--;

Col. 6, Line 62, after "the" (second occurrence), insert --information actually--; after "stored", insert --relating to--;

Col. 7, Line 2, after "battery" insert --Bl--;

Col. 7, Line 18, after "are" insert --actually--;

CLAIM 18, Line 33, "comprices" should be --comprises--.

Signed and Sealed this

***Thirtieth* Day of *March 1982***

[SEAL]

*Attest:*

GERALD J. MOSSINGHOFF

*Attesting Officer* *Commissioner of Patents and Trademarks*

UNITED STATES PATENT AND TRADEMARK OFFICE

CERTIFICATE OF CORRECTION

PATENT NO. : 4,290,538

DATED : September 22, 1981

INVENTOR(S) : Roy L. White, David F. A. Leevers, Peter W. Kitchin

It is certified that error appears in the above—identified patent and that said Letters Patent is hereby corrected as shown below:

On the cover sheet after "Assignee" delete "Dresser Europe S.A., Brussels, Belgium" and substitute --Dresser Industries, Inc., Dallas, Texas--.

Signed and Sealed this

*Fifteenth* Day of *June 1982*

[SEAL]

*Attest:*

GERALD J. MOSSINGHOFF

*Attesting Officer* *Commissioner of Patents and Trademarks*